(12) United States Patent
Ramesh

(10) Patent No.: US 6,649,705 B2
(45) Date of Patent: *Nov. 18, 2003

(54) HYPERBRANCHED POLYOL MACROMOLECULE, METHOD OF MAKING SAME, AND COATING COMPOSITION INCLUDING SAME

(76) Inventor: Swaminathan Ramesh, 47417 Stratford Dr., Canton, MI (US) 48187

( * ) Notice: Subject to any disclaimer, the term of this patent is extended or adjusted under 35 U.S.C. 154(b) by 0 days.

This patent is subject to a terminal disclaimer.

(21) Appl. No.: 10/040,819

(22) Filed: Jan. 7, 2002

(65) Prior Publication Data

US 2002/0082359 A1 Jun. 27, 2002

Related U.S. Application Data

(63) Continuation of application No. 09/470,405, filed on Dec. 22, 1999, now Pat. No. 6,569,956.

(51) Int. Cl.$^7$ ............... C08G 63/78; C08G 63/60; C08G 63/91
(52) U.S. Cl. ............... 525/437; 525/449; 525/450; 528/297; 528/302
(58) Field of Search ............... 528/297, 302; 525/437, 449, 450

(56) References Cited

U.S. PATENT DOCUMENTS

| | | | |
|---|---|---|---|
| 2,979,514 A | 4/1961 | O'Brien | 260/340.2 |
| 3,479,328 A | 11/1969 | Nordstrom et al. | 260/86.1 |
| 3,674,838 A | 7/1972 | Nordstrom | 260/482 |
| 4,126,747 A | 11/1978 | Cowherd et al. | 520/166 |
| 4,279,833 A | 7/1981 | Culbertson et al. | 260/464 |
| 4,301,257 A | 11/1981 | Zengel et al. | 525/329 |
| 4,340,497 A | 7/1982 | Knopf | 252/188.3 |
| 4,758,632 A | 7/1988 | Parekh et al. | 525/383 |
| 4,791,168 A | 12/1988 | Salatin et al. | 524/601 |
| 4,820,830 A | 4/1989 | Blank | 560/158 |
| 5,326,815 A | 7/1994 | Serdiuk et al. | 524/591 |
| 5,356,669 A | 10/1994 | Rehfuss et al. | 427/407.1 |
| 5,373,069 A | 12/1994 | Rehfuss et al. | 525/456 |
| 5,418,301 A | 5/1995 | Hult et al. | 525/437 |
| 5,563,208 A | 10/1996 | König et al. | 524/591 |
| 5,663,247 A | 9/1997 | Sörensen et al. | 525/533 |
| 5,792,810 A | 8/1998 | Menovcik et al. | 524/590 |
| 5,834,118 A | 11/1998 | Rånby et al. | 428/482 |
| 5,852,162 A | 12/1998 | Smith et al. | 528/272 |
| 5,869,191 A | 2/1999 | Clemons Van Gaalen et al. | 428/842 |
| 5,945,499 A | 8/1999 | Ohrbom et al. | 528/75 |
| 5,976,615 A | 11/1999 | Menovcik et al. | 427/140 |
| 6,376,596 B1 | 4/2002 | Barsotti et al. | 524/500 |
| 6,462,144 B1 | 10/2002 | Ramesh et al. | 525/438 |
| 6,515,192 B1 | 2/2003 | Rink et al. | 585/16 |

FOREIGN PATENT DOCUMENTS

| | | | |
|---|---|---|---|
| DE | 199 40 855 | 3/2001 | C08G/63/20 |
| EP | WO93/17060 | 9/1993 | C08G/63/02 |
| EP | WO94/10211 | 5/1994 | C08F/8/30 |
| EP | WO97/45474 | 12/1997 | C08G/81/00 |
| WO | WO00/18516 | 4/2000 | |

OTHER PUBLICATIONS

Bo Pattersson, Perstorp Polyols– Application Technology, S–284 80 Perstrop Sweden, entitled Hyperbranched Polymers– unique design tools for multi property control in resin and coatings, pp. 1–19, and Generation 2–4, 1995.

Young H. Kim, DuPont CR&D, Experimental Station, E328/261, Wilmington, Delaware 19808, Apr. 13, 1998 pp. 1685–1698.

M. Trollsås et al., entitled Highly functional branched and dendri–graft aliphatic polyesters through ring opening polymerization, vol. 31, No. 9, 1998, pp. 2756–2763.

English Language Abstract for WO00/18516 is on front page of the International Publication.

Rink, et al., 10/049,607, filed Feb. 14, 2002, entitled "Solventborne coating material and its use," pages.

Ramesh et al., 10/106,000, filed Mar. 25, 2002, entitled "Carbamate–functional resins and there use in high solids coating compositions", p. 1–40.

Kim, 1999, entitled "Process in Hyperbranched polymers," p. 61.

Brenner, 1995, entitled "Hyperbranched polymers: modification with flexible chains" pp. 176–177.

*Primary Examiner*—Patricia A. Short

(57) ABSTRACT

A hyperbranched polyester polyol macromolecule, having a plurality of both embedded and exterior hydroxyl groups thereon, may be synthesized in a polymerization reaction having several steps. The hyperbranched polyol includes a central nucleus, a first chain extension, an intermediate substituent and a second chain extension. The central nucleus is a hydrocarbon structure with a plurality of oxygen atoms. The first chain extender is attached to the central nucleus and includes a carboxylic ester group and a plurality of hydroxyl groups. The intermediate substituent is attached to the first chain extender, and is a polyfunctional carboxylic acid or anhydride thereof. The preferred intermediate substituent is a cyclic compound. The second chain extension is attached to the intermediate substituent. The preferred second chain extension includes a glycidyl ester or epoxy. Methods of making a hyperbranched polyester polyol are also disclosed. Coating compositions in which the hyperbranched polyol is reacted with an aminoplast or with an isocyanate are also encompassed by the invention.

6 Claims, 1 Drawing Sheet

HYPERBRANCHED POLYOL MACROMOLECULE, METHOD OF MAKING SAME, AND COATING COMPOSITION INCLUDING SAME

CROSS-REFERENCE TO RELATED APPLICATION

The present application is a continuation application of U.S. Ser. No. 09/470,405, filed on Dec. 22, 1999, now U.S. Pat. No. 6,569,956, which is incorporated herein by reference.

BACKGROUND OF THE INVENTION

1. Field of the Invention

The present invention relates to a hyperbranched polyol macromolecule having both primary and secondary hydroxyl groups as part of the structure thereof, and also including a branched hydrocarbon chain to give flexibility to the polymer. More particularly, the present invention relates to a hyperbranched polyester polyol macromolecule, of the type described, which is usable to form high-solids coating compositions; to a method of making the macromolecule, and to coating compositions made therewith.

2. Description of the Background Art

Certain hyperbranched macromolecules are known for use in preparing high-solids coating compositions.

U.S. Pat. No. 5,418,301 to Hult et al. teaches a dendritic macromolecule which is formed beginning with a central initiator molecule having reactive hydroxyl groups thereon. A monomeric chain extender is attached to each of the reactive hydroxyl groups to form a highly branched structure. A chain stopper molecule may, optionally, be added to the chain extender to further increase the size of the macromolecule, and to terminate the macromolecule-forming reaction.

U.S. Pat. No. 5,663,247 to Sorensen et al. discloses another hyperbranched polyester macromolecule, formed from an epoxide nucleus and hydroxy-functional carboxylic acid chain extenders, and a method of making the hyperbranched macromolecule.

Other polyesters are disclosed in U.S. Pat. Nos. 5,852,162 and 5,869,191.

Some coating compositions formed with the known hyperbranched macromolecule have a tendency to crack when they are flexed. Such relatively brittle materials are less than optimal for use in making coating compositions which are intended to be applied to automotive bodies or flexible materials, such as resiliently bendable plastics or elastomers. Since modern engineering often combines dissimilar materials such as, e.g., metal and plastics or elastomers into an assembled product to be painted, a need exists for coatings which are useful to paint all of such dissimilar materials.

Although the known hyperbranched macromolecules are useful for their intended purposes, a need still exists in the art for an improved hyperbranched macromolecule having engineered properties which allow formation of coating compositions which are both durable and flexibly resilient.

SUMMARY OF THE INVENTION

The present invention provdes a hyperbranched polyester polyol macromolecule having a plurality of both embedded and exterior hydroxyl groups with a branched hydrocarbon chain for flexibility thereon.

A hyperbranched polyol in accordance with the invention, generally, includes
 a) a central nucleus comprising a hydrocarbon structure with a plurality of oxygen atoms;
 b) a first chain extension attached to the central nucleus, the first chain extension being formed from a compound comprising a carboxyl group and a plurality of hydroxyl groups;
 c) an intermediate substituent attached to the first chain extension, the intermediate substituent being formed from a compound selected from the group consisting of polyfunctional carboxylic anhydrides and acids thereof; and
 d) a second chain extension attached to the intermediate substituent, the second chain extension comprising a hydroxyl group and being formed from a flexible hydrocarbon compound having a terminal or non-terminal epoxide group thereon.

A particularly preferred starter polyol for use in the present invention is trimethylol propane. A preferred intermediate substituent for attaching to the first chain extension is a cyclic anhydride or acid thereof, most preferably an alicyclic anhydride or acid.

The present invention also encompasses a method of making a hyperbranched polyester polyol. A method in accordance with the invention, generally, includes the steps
 a) reacting a polyol with a first chain extender, which contains a plurality of hydroxyl groups and also contains a carboxyl group, to form a first generation branched core;
 b) optionally, further reacting the first generation branched core with the first chain extender, to form a subsequent generation branched core;
 c) reacting the first or subsequent generation branched core with a compound selected from the group consisting of carboxylic anhydrides and acids to form an ester bridge therewith, thereby forming an intermediate polyester macromolecule; and
 d) reacting the intermediate polyester macromolecule with a second chain extender having a terminal or non-terminal epoxide group in a flexible hydrocarbon chain thereon, to form a hyperbranched polyol having both primary and secondary hydroxyl groups thereon.

Hyperbranched polyols which are products of the above method exhibit the low viscosity needed for coatings operations.

Accordingly, it is an object of the present invention to provide a method of making a hyperbranched polyester polyol having both exterior (primary) and partially embedded (secondary) hydroxyl groups in the structure thereof.

Figure 1:
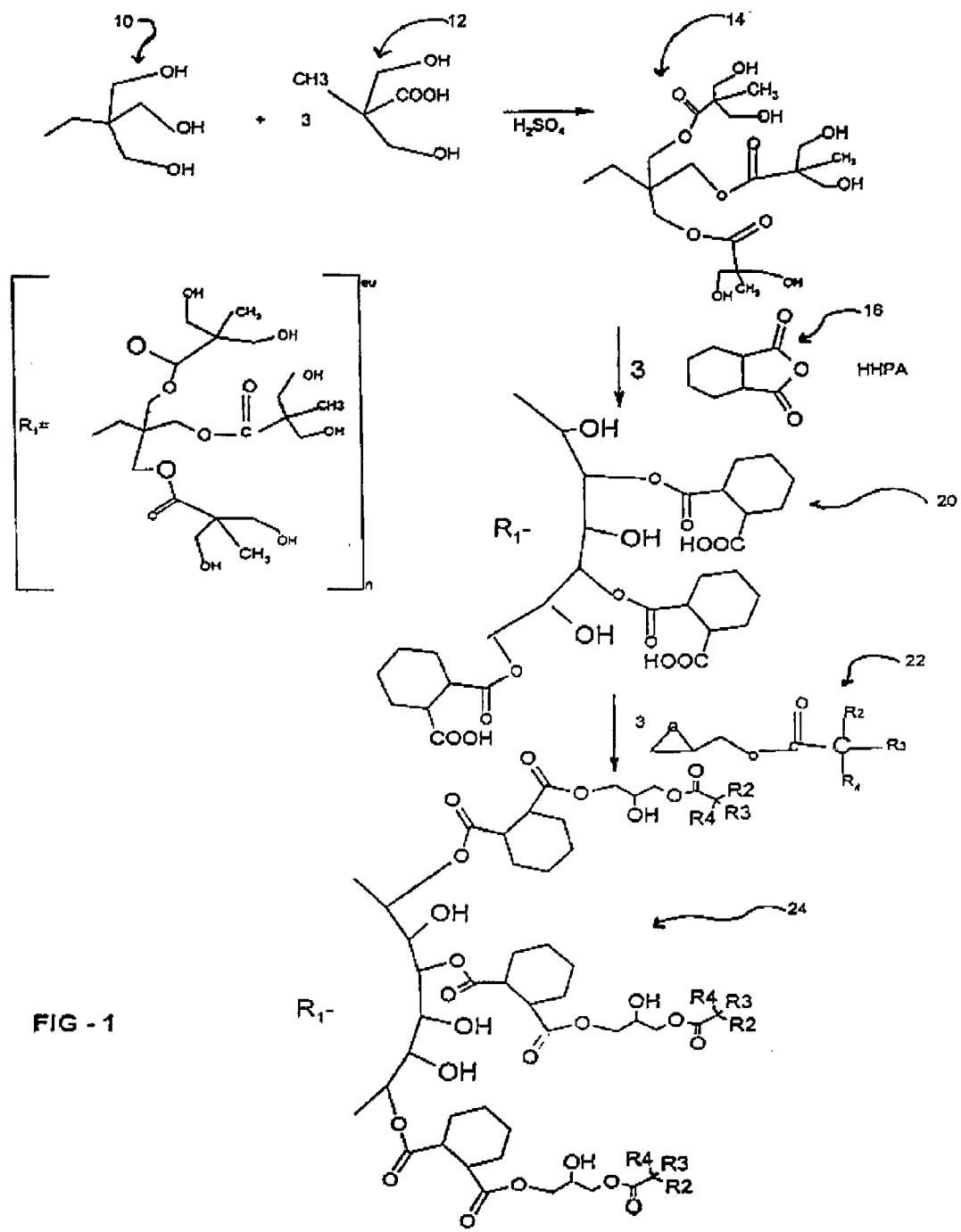
FIG. 1 shows the hyperbranched polyol exemplified in Resin Example 1.

For a more complete understanding of the present invention, the reader is referred to the following detailed description section and the Examples set out therein.

DETAILED DESCRIPTION OF THE PREFERRED EMBODIMENT

The present invention provides a hyperbranched polyester polyol macromolecule having a plurality of primary, or exterior hydroxyl groups thereon, and also having a plurality of secondary, or embedded hydroxyl groups.

As used throughout the present specification, the term "primary hydroxyl group" is intended to mean a hydroxyl group located at or near the outer periphery of the hyperbranched molecule, so as to be relatively accessible for reaction, and the term "secondary hydroxyl group" is intended to mean a hydroxyl group which is located deeper in the branched structure than the outer periphery, that is, which is at least partially embedded in the macromolecule.

While not wishing to be bound by any theory, it is believed that this dual level of hydroxyl groups in the macromolecule with the hydrocarbon chain from the second extension, when the polyol hereof is used in a coating composition, contributes to both hardness and flexibility of the finished coating composition. Also, depending on the ratios of the primary to the secondary hydroxyls present, the final properties of the coating can be tailored to suit the needs of the application.

A hyperbranched polyol in accordance with the invention, generally, includes:

a) a central nucleus comprising a hydrocarbon structure with a plurality of oxygen atoms;

b) a first chain extension attached to the central nucleus, the first chain extension being formed from a compound comprising a carboxyl group and a plurality of hydroxyl groups;

c) an intermediate substituent attached to the first chain extension, the intermediate substituent being formed from a compound selected from the group consisting of polyfunctional carboxylic anhydrides and acids thereof; and d) a second chain extension attached to the intermediate substituent, the second chain extension being formed from a flexible hydrocarbon compound having a terminal or non-terminal epoxide group thereon.

Preferably, the hyperbranched polyol macromolecule hereof has a plurality of primary hydroxyl groups and a plurality of secondary hydroxyl groups thereon.

Method of Making the Polyol

The present invention also encompasses a method of making a hyperbranched polyester polyol. A method in accordance with the invention, generally, includes a first step of reacting a starter polyol with a first chain extender, which contains a plurality of hydroxyl groups and also contains a carboxyl group, to form a first generation branched core.

In this first step, preferred starter polyols are those having two or more reactive hydroxyl groups thereon. Diols such as ethylene glycol, propylene glycol, dimethylolpropionic acid and related structures may be used as starter polyols. Triols such as glycerol, trimethylol propane, trimethylol butane and related structures are favored, although compounds having four hydroxyl groups thereon, such as pentaerythritol, may also be used as starter polyols. A particularly preferred starter polyol, for use in forming the central core, is trimethylol propane (TMP).

Also in the first step, materials usable as the first chain extender include carboxylic acids having two or more hydroxyl groups thereon, as well as carboxylic acids of the type described in which one or more of the hydroxyl groups have been hydroxyalkyl substituted. A particularly preferred material for use as the first chain extender is dimethylol propionic acid (DMPA).

A conventional esterification catalyst may be used in this first step, if desired, such as sulfuric acid, dibutyltin oxide or other known catalyst.

Optionally, this first generation branched core may be further reacted with the first chain extender, or with another different monomer having a similar structure as described above in connection with the first chain extender, one or more additional times, as desired, to cause further branching and growth thereof. Such additional polymerization of the first generation branched core, where used, forms a second, third, fourth, or higher generation branched core, as desired, and according to the particular needs under consideration.

The next step in the method of forming the hyperbranched macromolecule hereof involves reacting the branched core, at whatever level of generational branching is used, with an intermediate substituent which includes a polyfuntional carboxylic anhydride or acid thereof, to form an intermediate polyester macromolecule having reactive carboxyl groups thereon. The intermediate substituent may be selected from, e.g., phthalic acid, isophthalic acid, orthophthalic anhydride, tetrahydrophthalic anhydride, hexahydrophthalic anhydride, trimellitic anhydride, succinic anhydride and similar such compounds. Preferred materials for use as the intermediate compound are cyclic polyfunctional carboxylic anhydrides. Particularly preferred materials, for use as the intermediate substituent, are hexahydrophthalic anhydride (HHPA) and methyl, hexahydrophthalic anhydride.

The next step in the method of forming the hyperbranched polyol macromolecule hereof involves reacting the intermediate polyester macromolecule with a second chain extender to form a hyperbranched polyol macromolecule having both primary and secondary hydroxyl groups thereon.

The second chain extender is a flexible hydrocarbon compound having a terminal or non-terminal epoxide group thereon. The second chain extender may be selected from the group consisting of glycidyl esters, glycidyl ethers, epoxides, epoxy resins, epoxidized acids, and epoxidized alcohols. Preferably, the second chain extender is selected from the group consisting of glycidyl esters and glycidyl ethers.

Some examples of possible compounds usable as the second chain extender include cyclohexane oxide, any aliphatic chain with terminal or non-terminal epoxide group such as, for example, cis 2,3-epoxybutane, 1-2-epoxybutene, 1-2-epoxyhexane, 1-2-epoxyoctane, 1-2-epoxydecane, cis-7,8-epoxy-2-methyloctadecane, hexafluoropropylene oxide, and the glycidyl esters having a chain length of between 5 and 13 carbon atoms. A useful glycidyl ester is sold by the Shell Chemical company under the trademark "cardura". The above list is intended to be illustrative rather than limitative. Those skilled in the art will realize that many other compounds may be used. The present invention also relates to coating compositions made using the hyperbranched macromolecule hereof. In particular, the hyperbranched polyol hereof is suitable for use in preparing clear topcoat compositions.

In formulating these coating compositions, the macromolecule with the dual levels of hydroxyl groups thereon may be reacted with an aminoplast curing agent, or may be reacted with an isocyanate or isocyanurate, or may be reacted with combinations of aminoplasts and isocyanates and/or isocyanurates. Also, if some of the carboxylic acids are incorporated into the structure of the macromolecule and are left free, they can be used to cross-link with polyepoxides to form a flexible coating.

The cross-linkers can be drawn from a list of known melamine-formaldehyde resins, isocyanates and isocyanurates and polyepoxides. The list would include, and is not restricted to, compounds like Cymel-303, fully methylated hexamethoxymethylmelamine, partially methylated methoxymethylmelamine, butoxymethylmelamines, butoxy, methoxymethylmelamines, hexamethylenediisocyanate (HDI), isophoronediisocyanate(IPDI), cyclohexanediisocyanate(CHDI), toluenediisocyanate (TDI), methylenediphenylenediisocyanate (MDI), the isocyanurates derived from HDI, IPDI, CHDI, TDI, MDI, epoxides from the EPON series sold by the Shell Chemical company, bis-phenol A type epoxides, acrylic polymers with glycidylacrylate or methacrylate as one of the monomers. Other ingredients that go into making the paint are well known to those knowledgeable in the art and would include flow additives for rheology control and leveling, solvents, catalysts.

When the curing takes place by reacting the hydroxyl groups of the hyper-branched compounds, either melamine-formaldehyde resins or isocyanates/isocyanurates can be used by themselves or combinations of them may be used. Likewise, the carboxylic acids can be cured with polyepoxides either by themselves or can have additional curing perpetuated by melamine-formaldehyde or isocyanates/isocyanurates. The ratios of cross-linkers to the reacting groups can be between 2–0.1, preferably between 1.2–0.8, based on their equivalent weights. When both primary and secondary hydroxyls are present, the amounts of cross-linkers can be varied such that all the primary hydroxyls will react leaving the secondary hydroxyls free for adhesion purposes, or a fraction of these also reacted to give better humidity resistance.

In general, it has been found that with a dual cure (hydroxyls with melamine-formaldehyde and isocyanates or isocyanaurates, or carboxylic acids with epoxides and hydroxyls with melamine-formaldehyde or isocyanates or isocyanaurates), the resulting film exhibited excellent etch characteristics.

EXAMPLES

The following examples are intended to illustrate, and not to limit the application of the invention. In the following examples, all parts are by weight of the total composition, unless otherwise specified.

Resin Example 1

Referring to the illustrated example in the diagram of FIG. 1, a starter polyol 10, shown as a molecule of TMP, is reacted with three molecules of a first chain extender 12, DMPA, in the presence of a sulfuric acid catalyst, to form a first generation branched core 14. As referred to above, this process of reaction with the first chain extender 12 may be repeated as desired, to form a second or higher generation branched core (not shown).

Then, the branched core 14 is reacted with a suitable number of moles of an intermediate reactant 16 which is a polyfunctional carboxylic anhydride or acid thereof, to form an intermediate polyester macromolecule 20 having reactive carboxyl groups thereon. In the example of FIG. 1, the intermediate reactant 16 is hexahydrophthalic anhydride (HHPA). The intermediate reactant 16 forms an intermediate substituent in the final hyperbranched macromolecule product.

The intermediate reactant 16 reacts with selected hydroxyl groups of the branched core 14, while leaving other hydroxyl groups on the core unreacted. This is an important aspect of the present invention, and therefore an excess of the intermediate reactant 16 is disfavored. The reaction between the branched core 14 and the intermediate reactant 16 forms an intermediate polyester macromolecule 20 having a plurality of reactive carboxyl groups thereon.

Finally, the intermediate polyester macromolecule 20 is further reacted with a second chain extender 22 which, in this example, is a compound having a terminal epoxide group and a flexible hydrocarbon chain thereon, to form the hyperbranched polyol 24 of the invention, which has both primary and secondary hydroxyl groups thereon.

In the depicted embodiment, this second chain extender 22 is a branched glycidyl ester sold by the Shell Chemical company as CARDURA E-10. In the illustration of FIG. 1, $R_1$ represents the base structure of the intermediate polyester macromolecule, which is symbolized to avoid the necessity of continually redrawing the structure thereof, and $R_2$, $R_3$, and $R_4$, respectively, represent small alkyl groups. In this example, the epoxide ring of the glycidyl ester 22 is opened, and the oxygen molecule thereof is converted to a hydroxyl group. Again, by choosing not to react all the carboxylic acids with the epoxide, a molecule containing primary and secondary hydroxyl groups along with carboxylic acids can be obtained.

In the example of FIG. 1, the polyester was formulated according to the following table.

TABLE 1

| TMP | 1 mole |
|---|---|
| DMPA | 3 moles |
| HHPA | 3 moles |
| CARDURA E-10* | 3 moles |

*(CARDURA is a trademark of the Shell Chemical company).

67 grams of trimethylol propane was charged into a reaction flask equipped with a stirrer, along with 201 grams of dimethylol propionic acid and 0.2 grams of sulfuric acid as a catalyst. The temperature was raised, to 140 degrees C., over a 45 minute period. A stream of nitrogen was used to help remove the water formed during the condensation reaction. A vacuum pump was connected to the flask at the end of the reaction to complete the removal of the water of the condensation reaction.

This reaction resulted in the synthesis of a first generation branched core 14.

Then, 231 grams of HHPA was added and was heated to 140° C. and the reaction was monitored by IR equipment for the disappearance of the anhydride peak. This resulted in the formation of an intermediate polyester macromolecule 20. 50 grams of Aromatic 100 were added to adjust the viscosity of the product.

When this reaction was complete, 342 grams of CARDURA E-10 were added and the temperature kept at 140° C. Again, the reaction was followed by the epoxide peak in IR monitoring equipment. Completion of the reaction resulted in formation of the hyperbranched polyol macromolecule 24, which has three primary hydroxyl groups, three secondary hydroxyl groups and no carboxyl groups.

Resin Example 2

A polyester was formulated according to the following table.

TABLE 2

| TMP | 1 mole |
|---|---|
| DMPA | 3 moles |
| HHPA | 4 moles |
| CARDURA E-10 | 2 moles |

As described in Example 1, 67 grams of TMP and 201 grams of DMPA were reacted in presence of dibutyltin oxide (0.1 g) to form the first generation branched core 14. This, in turn, was reacted with 308 grams of hexahydrophthalic anhydride at 140° C, followed by reaction with 228 grams of Cardura E10 at 140° C. As before, the reactions were monitored for completion by IR equipment. This gave a hyper-branched polyol with two primary hydroxyl groups, two secondary hydroxyl groups and two carboxylic acid groups.

Resin Example 3

A polyester was formulated according to the following table.

TABLE 3

| TMP | 1 mole |
| DMPA | 3 moles |
| MHHPA | 2 moles |
| CARDURA E-10 | 2 moles |

As described in Example 1, 67 grams of TMP and 201 grams of DMPA were reacted in presence of dibutyltin oxide (0.1 g) to form the first generation branched core 14. This, in turn, was reacted with 168 grams of methyl, hexahydrophthalic anhydride at 140° C., followed by reaction with 228 grams of Cardura E10 at 140° C. As before, the reactions were monitored for completion by IR equipment. This gave a hyper-branched polyol with four primary hydroxyl groups, two secondary hydroxyl groups and no carboxylic acid groups.

Resin Example 4

A polyester was formulated according to the following table.

TABLE 4

| TMP | 1 mole |
| DMPA | 6 moles |
| MHHPA | 6 moles |
| CARDURA E-10 | 4 moles |

As described in Example 1, 67 grams of TMP and 201 grams of DMPA were reacted in presence of dibutyltin oxide (0.1 g) to form the first generation branched core 14. This, in turn, was reacted with 201 grams of DMPA to get a second generation branched core containing twelve primary hydroxyl groups. This, in turn was reacted with 504 grams of methyl, hexahydrophthalic anhydride at 140° C., followed by reaction with 456 grams of Cardura E10 at 140° C. As before, the reactions were monitored for completion by IR equipment. This gave a hyper-branched polyol with six primary hydroxyl groups, four secondary hydroxyl groups and two carboxylic acid groups.

Paint Example 1

36 grams of resin from Example 1 were mixed with 10 grams of hexamethoxymethylmelamine (HMMM) at ambient pressure in an open container at room temperature, with 0.2 grams of dodecylbenzene sulfonic acid (DDBSA) as a catalyst. The reactants were mixed using a stirrer, and Aromatic 100 was used as a solvent to adjust the viscosity. The resultant mixture was drawn down on a metal plate substrate to make a thin clear coat test sample. The film was cured for 30 minutes at 250 degrees Fahrenheit, and subsequently passed an MEK double rub test of over 200.

Paint Example 2

36 grams of resin from Example 1 were mixed with 19.5 grams of BASF HDI triisocyanate at ambient pressure in an open container at room temperature, with 0.2 grams of dibutyl tin dilaurate as a catalyst. The reactants were mixed using a stirrer, and Aromatic 100 was used as a solvent to adjust the viscosity. The resultant mixture was drawn down on a metal plate substrate to make a thin clear coat test sample. The film was cured for 30 minutes at 250 degrees Fahrenheit, and subsequently passed an MEK double rub test of over 100.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A hyperbranched polyol macromolecule, comprising:
   a) a central nucleus comprising a hydrocarbon structure with a plurality of oxygen atoms;
   b) a first chain extension attached to the central nucleus, the first chain extension being formed from a compound comprising a carboxyl group and a plurality of hydroxyl groups;
   c) an intermediate substituent attached to the first chain extension, said intermediate substituent being formed from a compound selected from the group consisting of polyfunctional carboxylic acids and anhydrides thereof; and
   d) a second chain extension attached to the intermediate substituent, said second chain extension being formed from a compound selected from the group consisting of glycidyl esters, cis 2,3-epoxybutane, 1-2-epoxybutane, 1-2-epoxyhexane, 1-2-epoxyoctane, 1-2-epoxydecane, cis-7,8-epoxy-2-methyloctadecane, and hexafluoropropylene oxide.

2. The macromolecule of claim 1, wherein said macromolecule has a plurality of primary hydroxyl groups and a plurality of secondary hydroxyl groups thereon.

3. The macromolecule of claim 1, wherein the second chain extension is formed selected from the group consisting of glycidyl esters, cis 2,3-epoxybutane, 1-2-epoxybutane, 1-2-epoxyhexane, 1-2-epoxyoctane, 1-2-epoxydecane, cis-7,8-epoxy-2-methyloctedecane, and hexafluoropropylene oxide from a compound selected from the group consisting of glycidyl esters having a branched structure and from 5 to 15 carbon atoms.

4. The macromolecule of claim 1 wherein the central nucleus is trimethylolpropane.

5. The macromolecule of claim 1 wherein the first chain extender is dimethylol propionic acid.

6. The macromolecule of claim 1 wherein the intermediate substituent (c) attached to the first chain extension is formed from a compound selected from the group consisting of phthalic acid, isophthalic acid, orthophthalic anhydride, tetrahydrophthalic anhydride and hexahydrophthalic anhydride to form an ester bridge therewith, thereby forming an intermediate polyester macromolecule.

* * * * *